(12) United States Patent
Guida et al.

(10) Patent No.: US 10,990,457 B2
(45) Date of Patent: Apr. 27, 2021

(54) INTERPOSITION

(71) Applicant: Apple Inc., Cupertino, CA (US)

(72) Inventors: Gianluca Guida, London (GB); Aleksandar Ristovski, Ottawa (CA); Stephen J. McPolin, Nepean (CA); Peter H. van der Veen, Ottawa (CA); Shawn R. Woodtke, Richmond (CA)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 16/076,513

(22) PCT Filed: Jun. 26, 2018

(86) PCT No.: PCT/US2018/039596
§ 371 (c)(1),
(2) Date: Aug. 8, 2018

(87) PCT Pub. No.: WO2019/005867
PCT Pub. Date: Jan. 3, 2019

(65) Prior Publication Data
US 2020/0310894 A1    Oct. 1, 2020

Related U.S. Application Data

(60) Provisional application No. 62/526,339, filed on Jun. 28, 2017.

(51) Int. Cl.
*G06F 9/54* (2006.01)
*G06F 11/36* (2006.01)

(52) U.S. Cl.
CPC ............. *G06F 9/546* (2013.01); *G06F 9/541* (2013.01); *G06F 11/362* (2013.01)

(58) Field of Classification Search
CPC ...... G06F 9/4843; G06F 9/4862; G06F 9/542; G06F 9/546
(Continued)

(56) References Cited

U.S. PATENT DOCUMENTS 7,404,203 B2   7/2008 Ng
7,490,333 B2   2/2009 Grimaud et al.
(Continued)

FOREIGN PATENT DOCUMENTS

EP    1086423 A1    3/2001

OTHER PUBLICATIONS

IPRP, PCT/US2018/039596, mailed Jan. 9, 2020, 11 pages.
(Continued)

*Primary Examiner* — Andy Ho
(74) *Attorney, Agent, or Firm* — Kowert, Hood, Munyon, Rankin & Goetzel, P.C.; Lawrence J. Merkel

(57) ABSTRACT

In an embodiment, an operating system is defined in terms of a set of actors, each of which implements one or more capabilities built into the system. The actors may establish channels between them for communication of messages between the actors. Some actors may interpose between other actors. These other actors may, in some cases, interpose on channels used by the base actor. In some embodiments, some channels may be interposed while others may be monitored by the interposing actor but may still communicate directly with the underlying actor. Some channels may not be affected by the interposition (e.g. the channels may not be interposed or monitored), in an embodiment. Other examples of interposition may include debugging, simulation, and sandboxing.

38 Claims, 9 Drawing Sheets

(58) Field of Classification Search
USPC .......................... 719/313, 317, 318; 718/100
See application file for complete search history.

(56) References Cited

U.S. PATENT DOCUMENTS

| | | | | |
|---|---|---|---|---|
| 8,966,435 B2* | 2/2015 | Kleingon | ................... | G06F 8/10 |
| | | | | 717/104 |
| 9,569,339 B1* | 2/2017 | Villalobos | ............. | G06F 11/362 |
| 9,652,364 B1* | 5/2017 | Kaila | ................... | G06F 11/3688 |
| 2003/0233634 A1* | 12/2003 | Carrez | ................ | G06F 11/3664 |
| | | | | 717/124 |

OTHER PUBLICATIONS

ISR/WO, PCT/2018/039596, mailed Oct. 17, 2018, 16 pages.
Graham Hamilton, Panos Kougiouris; "The Spring Nucleus: A Microkernel for Objects," SMLI TR-93-14 The SMLI Technical Report Series, Sun Microsystems Laboratories, Inc. Mountain View, CA 94043 USA Apr. 1993, 15 pages.
QNX Neutrino RTOS System Architecture, QNX Software Development Platform 6.6., QNX Software Systems Limited, 1001 Farrar Road, Ottawa, Ontario, K2K 0B3 Canada, printed from internet, Feb. 20, 2014, 324 pages.
Mach: A New Kernel Foundation for UNIX Development; Mike Accetta, Robert Baron, William Bolosky, David Golub, Richard Rashid, Avadis Tevanian and Michael Young Computer Science Department, Carnegie Mellon University Pittsburgh, Pa. 15213, Apr. 1986, 16 pages.
http://www.oracle.com/technetwork/indexes/documentation/index.html, Sun Microsystems, Inc. 901 San Antonio Road Palo Alto, CA 94303-4900 U.S.A. Documentation Home, ChorusOS 5.0 Features and Architecture Overview,Chapter 2 Architecture and Benefits of the ChorusOS Operating System, printed from the internet, Dec. 18, 2017, 17 pages.

* cited by examiner

INTERPOSITION

This application is a 371 of PCT Application No. PCT/US2018/039596, filed Jun. 26, 2018, which claims benefit of priority to U.S. Provisional Patent Application Ser. No. 62/526,339, filed on Jun. 28, 2017. The above applications are incorporated herein by reference. To the extent that any material in the incorporated application conflicts with material expressly set forth herein, the material expressly set forth herein controls.

BACKGROUND

Technical Field

This disclosure relates generally to electronic systems and, more particularly, to operating systems on such electronic systems.

Description of the Related Art

Most electronic systems (e.g. computing systems, whether stand alone or embedded in other devices) have a program which controls access by various other code executing in the system to various hardware resources such as processors, peripheral devices, memory, etc. The program also schedules the code for execution as needed. This program is typically referred to as an operating system.

Typically, operating systems are coded as a set of processes containing threads. The threads can be modified over time as the operating system evolves, and the code can become unwieldy, inefficient, and error-prone. Interfaces between threads can evolve ad-hoc, and thus changes in one thread can spiral out to many other threads, making maintenance difficult. Accordingly, expansion of operating system functionality becomes more and more complex. Debugging of such operating system code may also become more complex over time.

SUMMARY

In an embodiment, an operating system for a computer system is defined in terms of a set of actors, each of which implements one or more capabilities built into the system. The actors may establish channels between them for communication. A given actor may communicate with another actor via messages on the channels. An actor receiving a message and determining that a response is to be provided may also send those messages via a channel to the originating actor. A set of base actors may be defined, which provide basic functionality such as memory access, interrupt control, channel control, timer facilities, etc. Other actors may be defined which incorporate (e.g. inherit) the base actors and add additional capabilities. These other actors may, in some cases, interpose on channels used by the base actor. In some embodiments, some channels may be interposed while others may be monitored by the interposing actor but may still communicate directly with the underlying actor. Some channels may not be affected by the interposition (e.g. the channels may not be interposed or monitored), in an embodiment. Other examples of interposition may include debugging, sandboxing, and simulation.

BRIEF DESCRIPTION OF THE DRAWINGS

The following detailed description makes reference to the accompanying drawings, which are now briefly described.

Figure 1:
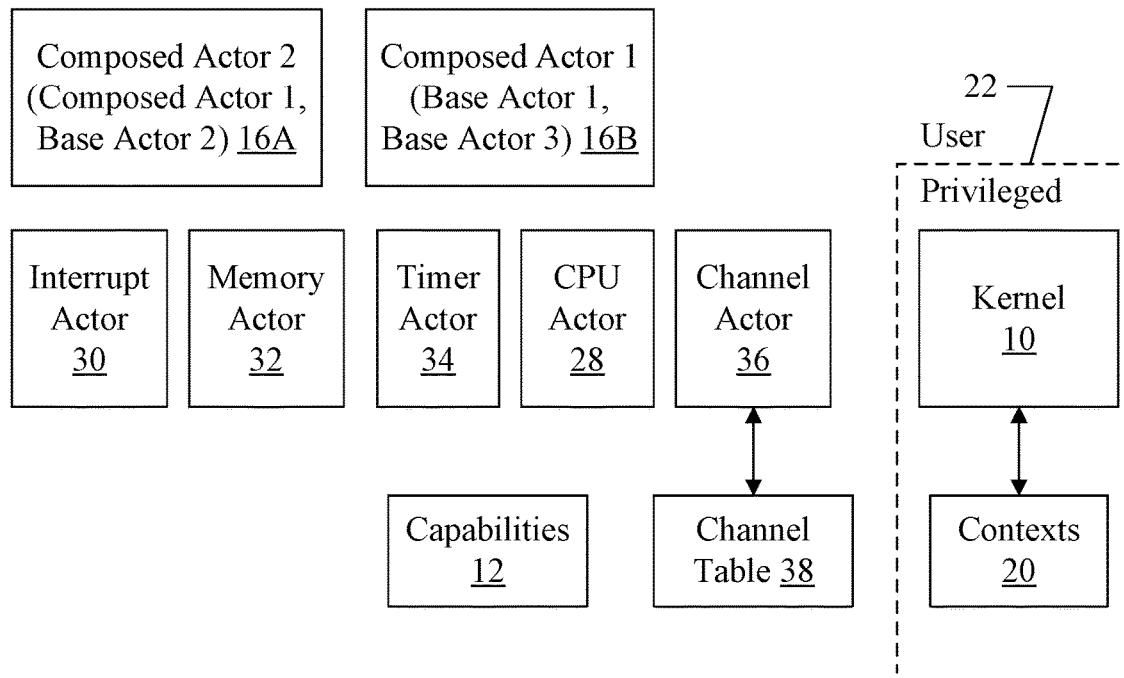
FIG. 1 is a block diagram of one embodiment of an operating system in accordance with this disclosure.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

Turning now to FIG. 1, a block diagram of one embodiment of an operating system and related data structures is shown. In the illustrated embodiment, the operating system includes a kernel 10, a set of capabilities 12, a set of base actors, and a set of composed actors 16A-16B. The base actors, in this embodiment, may include a central processing unit (CPU) actor 28, an interrupt actor 30, a memory actor 32, a timer actor 34, and a channel actor 36. Other embodiments may include other base actors, including subsets or supersets of the illustrated base actors and/or other actors. The kernel 10 may maintain one or more contexts 20. The channel actor 36 may maintain a channel table 38. There may be any number of base actors and composed actors in a given embodiment.

Each capability 12 includes a function in an address space that is assigned to the capability 12. The data structure for the capability 12 may include, e.g., a pointer to the function in memory in a computer system. In an embodiment, a given capability 12 may include more than one function. In an embodiment, the capability 12 may also include a message mask defining which messages are permissible to send to the capability 12. A given actor which employs the capability 12 may further restrict the permissible messages, but may not override the messages which are not permissible in the capability 12 definition. That is, the capability 12 definition may define the maximum set of permissible messages, from which a given actor may remove additional messages. While message masks are used in some embodiments, any mechanism for identifying valid messages for the capability and further restricting messages in a given actor may be used. The union of the permitted messages may be the permitted messages in the given actor.

Each base actor 28, 30, 32, 34, and 36 may employ one or more capabilities 12. A given actor may employ any number of capabilities, and a given capability may be employed by any number of actors. Because actors 28, 30, 32, 34, and 36 directly employ capabilities 12 and do not include other actors, the actors 28, 30, 32, 34, and 36 may be referred to as base actors. The base actors may provide the low level functions of the operating system. Other actors may be composed actors, such as the actors 16A-16B. Composed actors 16A-16B may be assembled from other actors, either base actors or other composed actors. Any amount of assembly may be permitted in various embodiments (e.g. composed actors may include other actors that are themselves composed actors, which may further include actors that are themselves composed actors, etc.). In an embodiment, a composed actor 16A-16B may employ additional capabilities 12 as well. In an embodiment, the operating system disclosed herein may be viewed as a lightweight capability system, as the structure to access the capability may simply be one or more pointers to the capability function. This differs from the use of keys and tree spanning access methods that some capability-based systems use.

Accordingly, an actor may generally be defined as a container for one or more capabilities, either directly employed or employed via the inclusion of another actor. A container may be any type of data structure, class, data type, etc. that can store data allowing the capabilities to be accessed/executed. For example, a data structure with pointers to capabilities (or to other actors which point to the capabilities in a pointer chain) may be one form of container. More generally, a container may be any structure that organizes a group of objects in a defined way that follows specific access rules. In an embodiment, actors may be compiled into the operating system and may be optimized to limit the number of exceptions that may occur (e.g. by merging code into the actor, allowing some or all of the actor to execute in privileged space, etc.). When the code is merged together, the exception in the code one actor that would have lead to execution of code in another actor may be eliminated since the code has been merged. However, the model that the system is designed to may be that the actor is a container and may be proven to be safe and stable. Then, the compiled version may be shown to be equivalent to the model and thus also safe and stable. Safety and stability may be critical in certain products in which the operating system may be employed. For example, the operating system may be in a computing system that is embedded in the product. In one particular case, the product may be a vehicle and the embedded computing system may provide one or more automated navigation features. The vehicle may be any type of vehicle, such as an aircraft, boat, automobile, recreational vehicle, etc. In some embodiments, the automated navigation features may automate any portion of navigation, up to and including fully automated navigation in at least one embodiment, in which the human operator is eliminated. Safety and stability may be key features of such an operating system. Additionally, security of the operating system may be key in such cases, as an attack which disables or destabilizes the system may disable the vehicle or possibly even cause a crash. In a traditional monolithic kernel operating system, the one operating system entity (the kernel) is responsible for all functions (memory, scheduling, I/O, time, thread management, interrupts, etc.). Any compromise in any of the functions could compromise the whole system. In the present operating system, however, the entities are separated and communicate via channels that do not permit compromise. Each entity may be provided with as much privileged and as needed to complete its operation. Thus, a compromise of one entity may not compromise the system and the leakage of privileged that often occurs in the monolithic kernel is not possible.

In an embodiment, the operating system may be a real time operating system that is designed to complete tasks within specified time intervals, so that the system may respond quickly enough to manage events that are occurring in "real time" (e.g. without undue buffering or other delays). For example, in the automated navigation functions mentioned above, the system may be able to react quickly enough to inputs in order to effectuate corresponding automated navigation outputs to keep the vehicle operating in a safe manner.

The dotted line 22 divides the portion of the operating system that operates in user mode (or space) and the portion that operates in privileged mode/space. As can be seen in FIG. 1, the kernel 10 is the only portion of the operating system that executes in the privileged mode in this embodiment. The remainder of the operating system executes in the user mode. Privileged mode may refer to a processor mode (in the processor executing the corresponding code) in which access to protected resources is permissible (e.g. control registers of the processor that control various processor features, certain instructions which access the protected resources may be executed without causing an exception, etc.). In the user mode, the processor restricts access to the protected resources and attempts by the code being executed to change the protected resources may result in an exception. Read access to the protected resources may not be permitted as well, in some cases, and attempts by the code to read such resources may similarly result in an exception. Because most of the operating system executes in the user space, the user mode protections may apply. Thus, "privilege leak," where privileged code that is expected to access only certain protected resources but actually accesses others through error or nefarious intent, may be much less likely in the disclosed embodiments. Viewed in another way, each entity in the system may be given the least amount of privileged possible for the entity to complete its intended operation.

Moreover, the kernel 10 may be responsible for creating/maintaining contexts 20 for actors, but may include no other functionality in this embodiment. Thus, in an embodiment, the kernel 10 may be viewed as a form of microkernel. The contexts 20 may be the data which the processor uses to resume executing a given code sequence. It may include settings for certain privileged registers, a copy of the user registers, etc., depending on the instruction set architecture implemented by the processor. Thus, each actor may have a context (or may have one created for it by the kernel 10, if it is not active at the time that another actor attempts to communicate with it).

The CPU actor 28 may be an actor by which other actors may interact with one or more CPUs in the computer system on which the operating system executes. For example, access to various processor state may be provided through the CPU actor 28. Interrupt delivery to a CPU may be through the CPU actor 28.

The interrupt actor 30 may be responsible for handling interrupts in the system (e.g. interrupts asserted by devices in the system to the processor, or processor's assertions to other processors). In an embodiment, the interrupt actor 30 may be activated by the kernel 10 in response to interrupts (as opposed to exceptions that occur within a processor in response to internal processor operation/instruction execution). The interrupt actor 30 may gather information about the interrupt (e.g. from an interrupt controller in the computing system on which the operating system executes, interrupt controller not shown) and determine which actor in the system should be activated to respond to the interrupt (the "targeted actor" for that interrupt). The interrupt actor 30 may generate a message to the targeted actor to deliver the interrupt.

The memory actor 32 may be responsible for managing memory, providing access to memory when requested by other actors and ensuring that a given memory location is only assigned to one actor at a time. The memory actor 32 may operate on physical memory. Other actors may be implemented to, e.g., provide a virtual memory system. Such actors may use the memory actor 32 to acquire memory as needed by the virtual memory system. That is, such actors may be composed actors that incorporate the memory actor 32 and other functions (e.g. capabilities, or capabilities in other actors).

The timer actor 34 may be responsible for implementing a timer in the system. The timer actor 34 may support messages to read the timer, set an alarm, etc.

The channel actor 36 may be responsible for creating and maintaining channels between actors. Channels may be the communication mechanism between actors for control messages. Data related to the control messages may be passed between actors in any desired fashion. For example, shared memory areas, ring buffers, etc. may be used.

In an embodiment, an actor may create a channel on which other actors may send the actor messages. The channel actor 36 may create the channel, and may provide an identifier (a channel identifier, or Cid) to the requesting actor. The Cid may be unique among the Cids assigned by the channel actor 36, and thus may identify the corresponding channel unambiguously. The requesting actor may provide the Cid (or "vend" the Cid) to another actor or actors, permitting those actors to communicate with the actor. In an embodiment, the requesting actor may also assign a token (or "cookie") to the channel, which may be used by the actor to verify that the message comes from a permitted actor. That is, the token may verify that the message is being received from an actor to which the requesting actor gave the Cid (or another actor to which that actor passed the Cid). In an embodiment, the token may be inaccessible to the actors to which the Cid is passed, and thus may be unforgeable. For example, the token may be maintained by the channel actor 36 and may be inserted into the message when an actor transmits the message on a channel. Alternatively, the token may be encrypted or otherwise hidden from the actor that uses the channel. In an embodiment, the token may be a pointer to a function in the channel-owning actor (e.g. a capability function or a function implemented by the channel-owning actor).

The channel actor 36 may track various channels that have been created in a channel table 38. The channel table 38 may have any format that permits the channel actor to identify Cids and the actors to which they belong. When a message having a given Cid is received from an actor, the channel actor 36 may identify the targeted actor (the actor that is to receive the message) via the Cid. The channel actor 36 may request activation of the targeted actor and may relay the message to the targeted actor.

In an embodiment, an actor may not be active (e.g., in execution) unless a message has been sent to the actor. An activation of an actor may be an instantiation of an actor to process the message. Each activation may have an associated context 20, that is created when the activation begins execution. Once the activation completes execution on the message, the activation terminates (or is "destroyed"). The context 20 may be deleted when the activation is destroyed. A new execution of the actor may then cause a new activation.

In an embodiment, each actor/capability within an actor may be activated to respond to a given message. The activation may be associated with a context 20, which may be created for the activation if a context for the actor does not yet exist in the contexts 20. Once the activation has completed processing the message, the actor may dissolve, or dematerialize, or destroy itself. The dissolving may include deleting the context and closing the thread. Thus, there may be not persistent threads in the system. Each thread may be activated when needed, and dissolve when complete. In other embodiments, threads may be created for each actor/capability. The threads may block, but remain live in the system, after completing processing of a message. Accordingly, the thread may be initialized already, and may have a context 20, when a given message is received for that thread to processor. Unless expressly tied to activation/dissolution herein, various features disclosed herein may be used with the longer-living threads. In such embodiments, an activation may be similar to unblocking a thread and a dissolve may be similar to blocking a thread.

Figure 2:
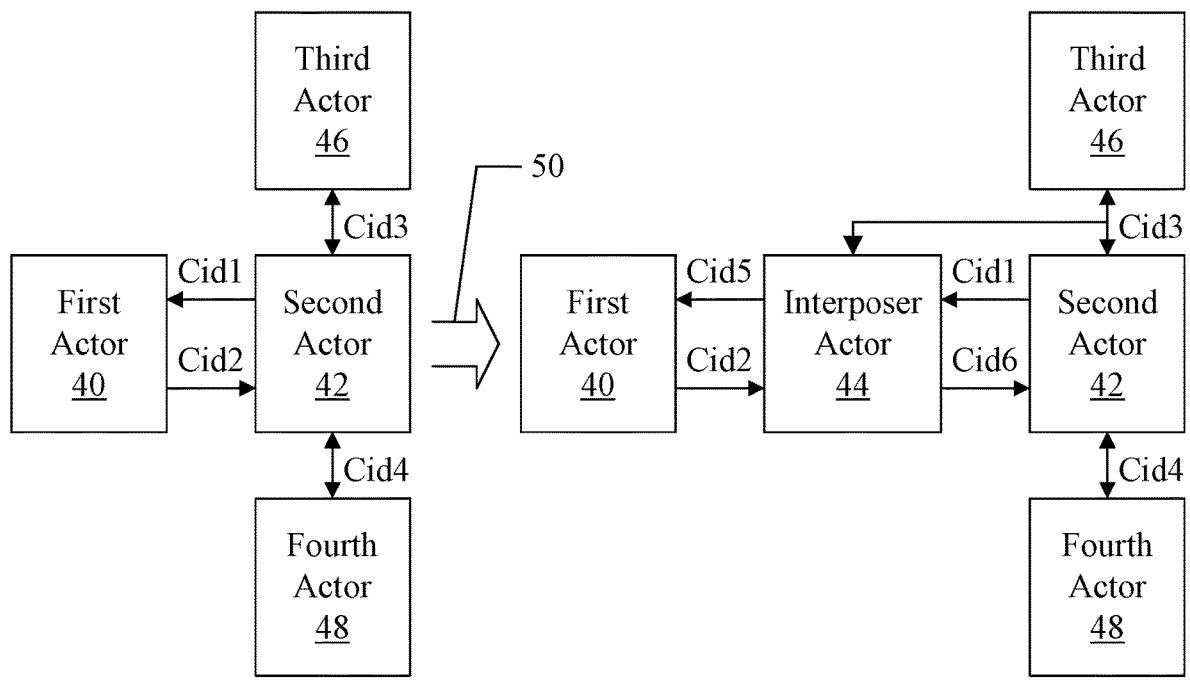
FIG. 2 is a block diagram of one embodiment of actors and an interposing actor.

In another embodiment, one or more of the base actors (e.g. one or more of the actors 28, 30, 32, 34, and 36) may execute in the privileged mode/space (e.g. on the same side of the dotted line 22 as the kernel 10 in FIG. 2).

FIG. 2 is a block diagram of one embodiment of a first actor 40, a second actor 42, an interposer actor 44, a third actor 46, and a fourth actor 48. Any of the actors 16A-16B, 28, 30, 32, 34, and 36 may be used as any of the actors 40, 42, 44, 46, and 48, and any other actor may be used. FIG. 2 illustrates interposition of the interposing actor 44 into an original configuration, which is illustrated on the left of the arrow 50 in FIG. 2.

The original system may include two channels between the first actor 40 and the second actor 42, identified by Cid1 and Cid2 in FIG. 2. The second actor 40 also has a channel to the third actor 46 (Cid3) and the fourth actor 48 (Cid4), respectively. Subsequently, the system is updated to include the interposing actor 44 between the first actor 40 and the second actor 42. The interposing actor 44 thus replaces the second actor 42 on the Cid2 channel from the first actor 40, and the interposing actor 44 replaces the first actor 40 on the Cid1 channel. A new channel with Cid5 is created between the interposing actor 44 and the first actor 40, and a new channel with Cid6 is created between the second actor 42 and the interposing actor 44. Accordingly, any messages between the first actor 40 and the second actor 42 may be intercepted by the interposing actor 44. In this example, the interposing actor 44 also monitors the messages between the third actor 46 and the second actor 42, but does not intercept the messages. Accordingly, the channel with Cid3 goes to both the second actor 42 and the interposing actor 44 in parallel. On the other hand, messages between the fourth actor 48 and the second actor 42 (Cid4) are not monitored or intercepted by the interposing actor 44 in the embodiment of FIG. 2. The operation of the interposing actor 44 may not be impacted by the communication between the fourth actor 48 and the second actor 42, for example.

Figure 3:
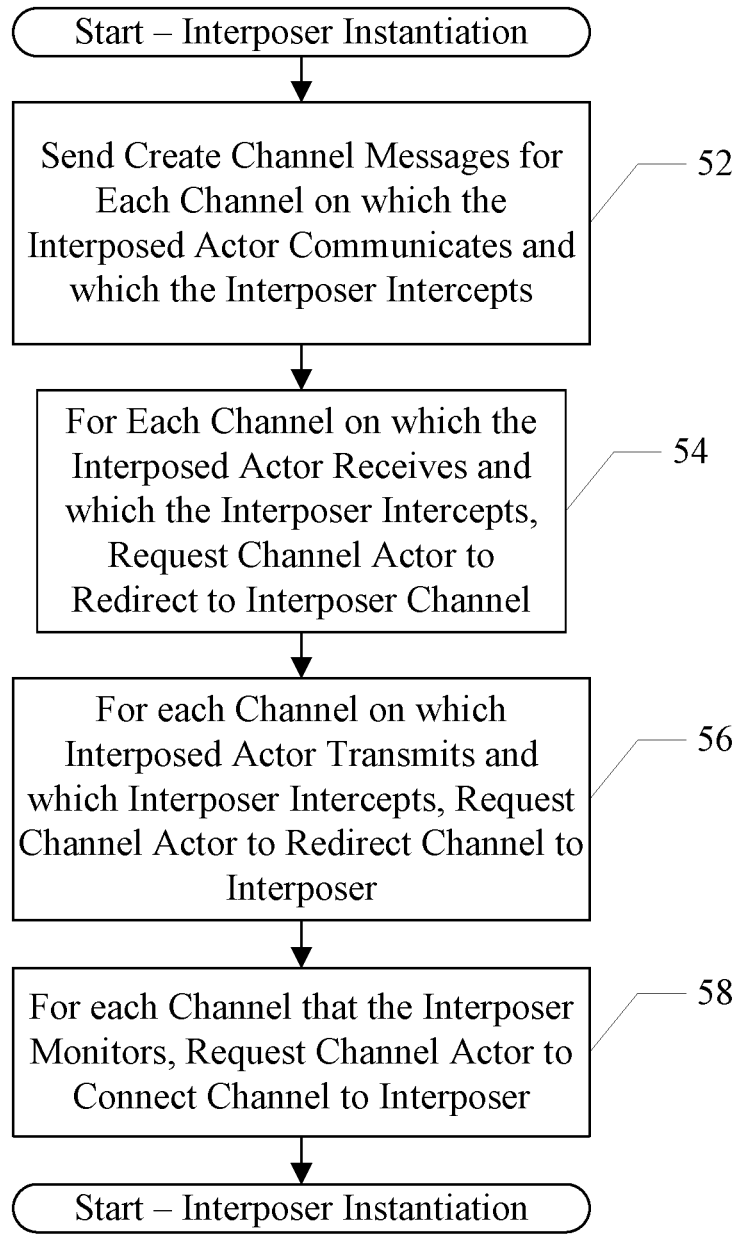
FIG. 3 is a flowchart illustrating operation of one embodiment of the operating system to instantiate an interposing actor.

FIG. 3 is a flowchart illustrating one embodiment of instantiating an interposer actor (e.g. the interposer actor 44) in the operating system. While the blocks are shown in a particular order for ease of understanding, other orders may be used. The operating system and/or various actors in the operating system may include instructions which, when executed in a computer system, may implement the operation shown in FIG. 3. That is, the operating system/actors may be configured to implement the operation shown in FIG. 3.

The operation of FIG. 3 may be performed during the build of the operating system (e.g. when the actors and kernel 10 are being compiled, or when the system is being launched). Alternatively, the operation may be performed dynamically during operation if the interposer actor 44 becomes desired during operation (e.g. via the enabling of operating system features implemented, at least in part, by the interposer actor 44, or detecting conditions in the system that warrant the use of the interposer actor 44).

The interposer actor 44 may be invoked, and may transmit create channel messages to the channel actor 36 for channels on which the interposed actor (e.g. the second actor 42 in FIG. 2) communicates and which the interposer actor 44 intercepts (block 52). For example, in FIG. 2, the interposer actor may transmit create channel messages for new channels in place of Cid1 to the first actor 40 and Cid2 to the second actor 42 The new channels with Cid5 and Cid6 may thus be created.

The interposer actor 44 may also transmit requests for the channel actor 36 to redirect channels on which the interposed actor receives messages and the interposed actor 44 is intercepting the messages (e.g. a request to redirect Cid2 from the second actor 42 to the interposer actor 44 for the embodiment in FIG. 2) (block 54). Similarly, for each channel on which the interposed actor transmits and the interposed actor 44 is intercepting messages, the interposer actor 44 may requests that the channel actor 36 redirect the channel to the interposer actor 44 (e.g. a request to redirect Cid1 to the interposer actor 44 instead of the first actor 40 for the embodiment of FIG. 2) (block 56). In one embodiment, the Cids may be rescinded from the actors to which the channels were previously connected (e.g. from the second actor 42 for Cid2). Alternatively, the actor may still have the Cid, but the channel actor 36 may simply not activate the actor for messages with that Cid. The actor may therefore not receive anything on the channel. Such a configuration may be used, e.g., if the interposer actor 44 is may be dynamically removed during operation, since the channel actor 36 may update the channel table 38 to activate the original actor in response to messages on the Cid after the interposer actor 44 is removed.

The interposer actor 44 may also transmit requests to monitor channels which the interposer actor 44 is to monitor but not intercept (e.g. a request to monitor cid3 in the embodiment of FIG. 2) (block 58). In this case, a message on Cid3 may both activate the receiving actor 42 or 46 and the interposer actor 44.

The flowchart of FIG. 3 presumes there is at least one type of each channel (intercepted outbound, intercepted inbound, and monitored). However, in various embodiments, one or more of the channel types may not be used and thus the corresponding requests may not be transmitted. Additionally, the operation of the channel actor 36 is not illustrated in FIG. 3. However, the channel actor 36 may determine whether or not to fulfill the requests of the interposer actor 44 based on a level of trust that the channel actor 36 has for the interposer actor 44. For example, the operating system may have data structures describing which actors may interpose on which other actors (not shown). The creator of the operating system may populate the structure with data based on the level of trust. In an embodiment, the interposer actor 44 may be authenticated prior to granting the level of trust and thus the ability to interpose.

Figure 4:
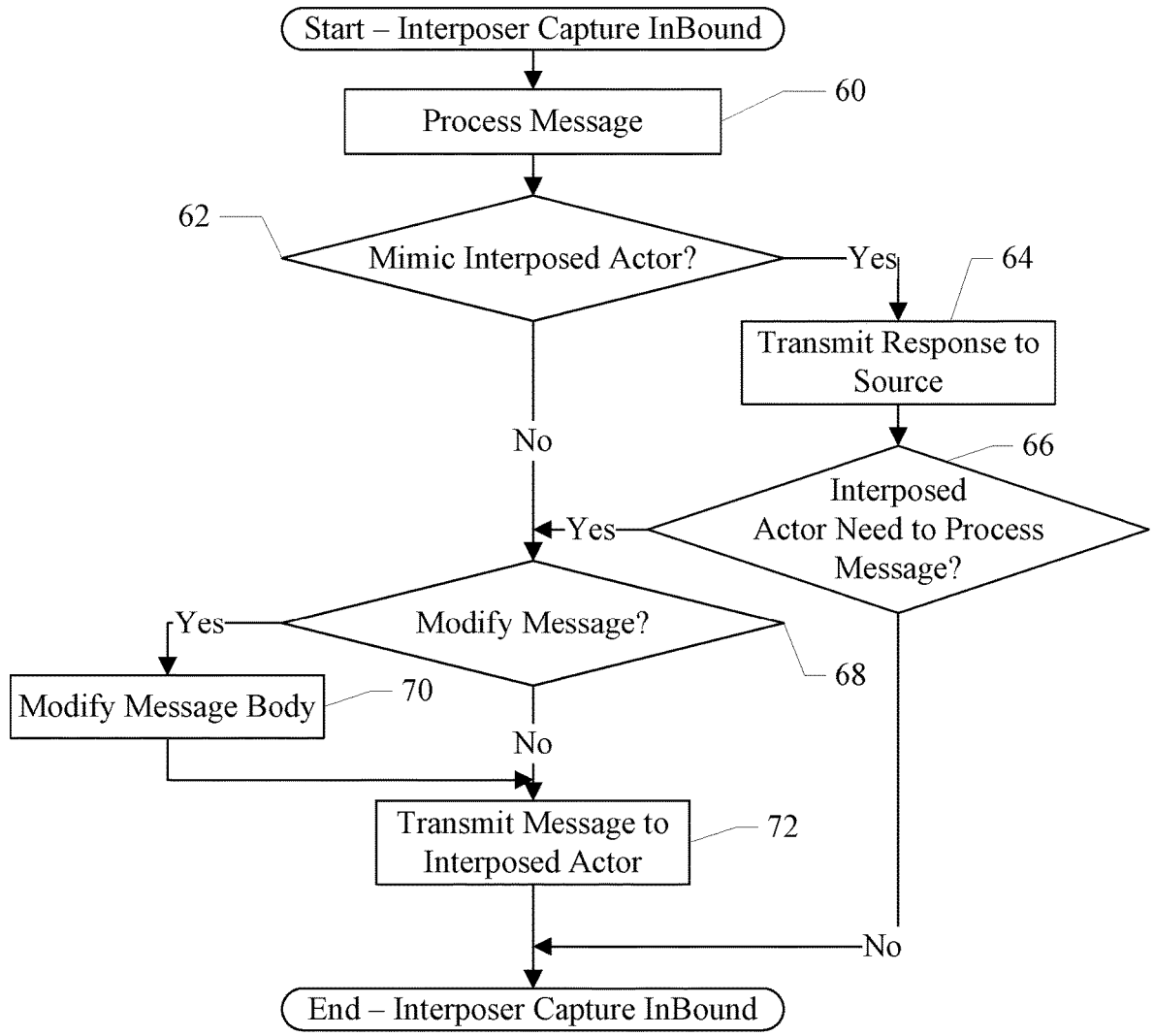
FIG. 4 is a flowchart illustrating operation of one embodiment of the operating system for an interposing actor capturing an inbound message to the interposed actor.

FIG. 4 is a flowchart illustrating one embodiment of an interposer actor (e.g. the interposer actor 44) in the operating system when intercepting an inbound message for the interposed actor (e.g. a message on Cid2 to the second actor 42 in the embodiment of FIG. 2). While the blocks are shown in a particular order for ease of understanding, other orders may be used. The operating system and/or various actors in the operating system may include instructions which, when executed in a computer system, may implement the operation shown in FIG. 4. That is, the operating system/actors may be configured to implement the operation shown in FIG. 4. Viewed in another way, the interposer actor 44 may perform the operation illustrated in FIG. 4 in response to an activation for a message on a inbound channel.

The interposer actor 44 may process the message, determining the contents of the message (block 60). For certain messages or message types, the interposer actor 44 may mimic the response of the interposed actor. If the inbound message is to be mimicked (decision block 62, "yes" leg), the interposer actor 44 may perform any desired processing and transmit a response to the source actor (block 64). In some cases, the interposed actor may still act on the message as well. If so (decision block 66, "yes" leg), the interposer actor 44 may determine if the message is to be modified before passing the message on to the interposed actor. If so (decision block 68, "yes" leg), the interposer actor 44 may modify the message body (block 70). In either case (decision block 68, "yes" or "no" legs), the interposer actor 44 may transmit the (possibly modified) message to the interposed actor (block 72). Similarly, for messages which are not mimicked but for which the interposer actor 44 is to affect the behavior of the interposed actor for the message (decision block 62, "no" leg and decision block 68, "yes" leg), the interposer actor 44 may modify the message to cause the desired behavior (block 70) and transmit the modified message to the interposed actor (block 72). For messages which may be passed through unmodified (decision blocks 62 and 68, "no" legs), the interposer actor 44 may transmit the unmodified message to the interposed actor (block 72). Optionally, the interposer actor 44 may log the contents of the messages and any mimicking/modification, if past messages may be used for future message processing.

Figure 5:
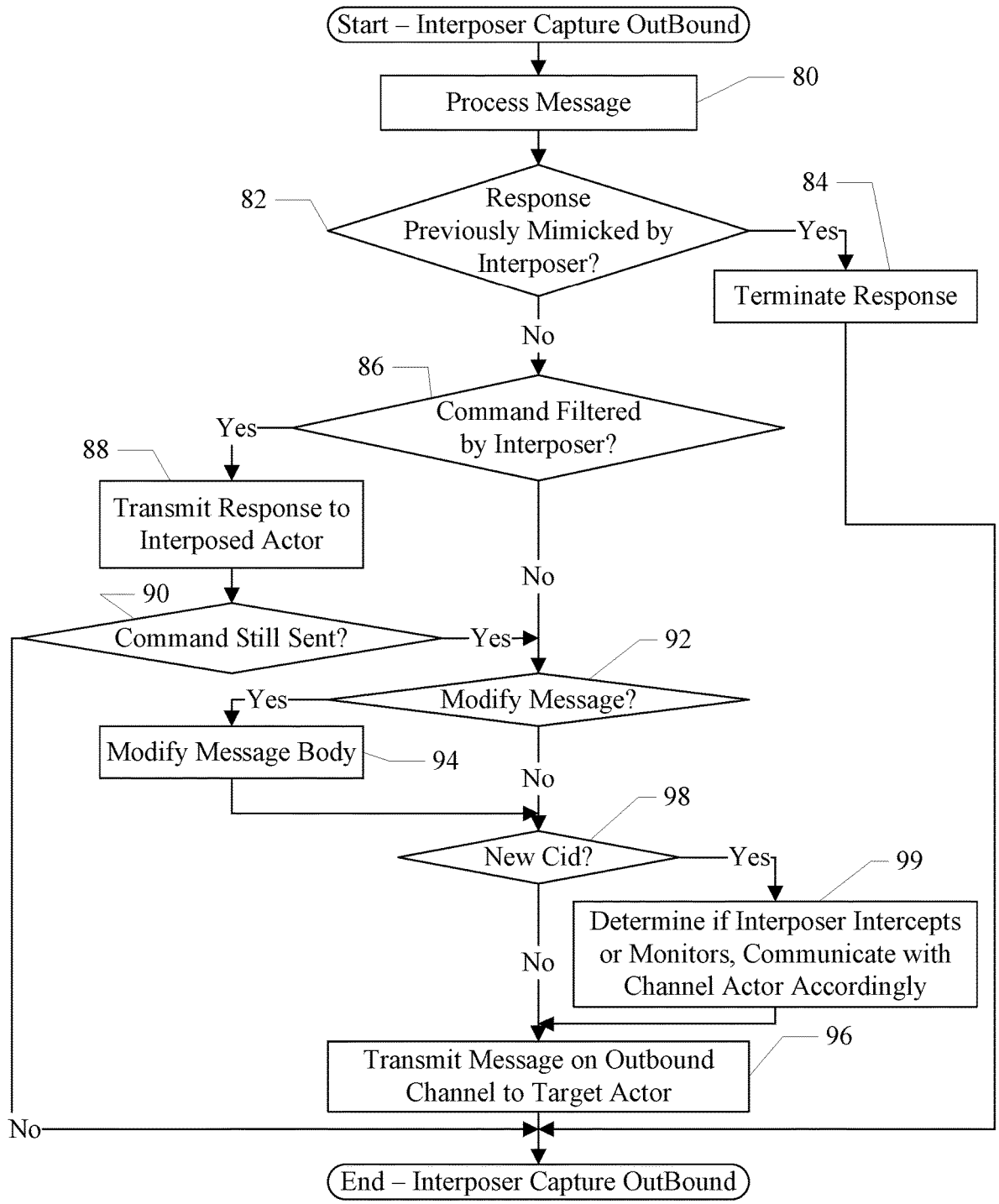
FIG. 5 is a flowchart illustrating operation of one embodiment of the operating system for an interposing actor capturing an outbound message from the interposed actor.

FIG. 5 is a flowchart illustrating one embodiment of an interposer actor (e.g. the interposer actor 44) in the operating system when intercepting an outbound message from the interposed actor (e.g. a message on Cid1 from the second actor 42 in the embodiment of FIG. 2). While the blocks are shown in a particular order for ease of understanding, other orders may be used. The operating system and/or various actors in the operating system may include instructions which, when executed in a computer system, may implement the operation shown in FIG. 5. That is, the operating system/actors may be configured to implement the operation shown in FIG. 5. Viewed in another way, the interposer actor 44 may perform the operation illustrated in FIG. 5 in response to an activation for a message on a outbound channel.

The interposer actor 44 may process the message, determining the contents of the message (block 80). If the message is a response that was mimicked by the interposer actor 44 (but the inbound message was still provided to the interposed actor, possibly modified) (decision block 82, "yes" leg), the interposer actor 44 may terminate the response (block 84). That is, the message may not be forwarded any further.

If the message is not a response previously mimicked by the interposer actor 44 (decision block 82, "no" leg), the message may be a command or request from the interposed actor that the interposer actor 44 filters (decision block 86, "yes" leg). If so, the interposer actor 44 may transmit a response to the interposed actor (block 88). The response may indicate that the request/command is complete to the interposed actor, and the request/command was successful, for example. The filtering of outgoing communications may be an analogue of mimicking incoming communications, in an embodiment. It is possible that the outgoing message may still be sent, in some embodiments. If so (decision block 90, "yes" leg), the interposer actor 44 may optionally modify the message (decision block 92, "yes" leg and block 94). Similarly, for outbound messages which are not filtered (decision block 86, "no" leg), the interposer actor 44 may optionally modify the message (decision block 92, "yes" leg and block 94). Another possibility is that the outgoing message includes a new Cid for a new channel that the interposed actor created to communicate with another actor. If the outgoing message includes a new Cid (decision block 98, "yes" leg), the interposer actor 44 may determine if the interposer actor 44 is to intercept or monitor the channel (block 99). If so, the interposer actor 44 may communicate with the channel actor 36 to intercept the channel or to monitor the channel, similar to FIG. 3, blocks 52, 54, 56, 58.

That is, if the interposer actor 44 is to intercept the channel, the interposer actor 44 may create a new channel and replace the new Cid in the outgoing message with the Cid of the interposer actor's newly created channel. The interposer actor 44 may also communicate with the channel actor 36 to reroute the new Cid from the interposed actor to the interposer actor 44. If the interposer actor 44 is to monitor the channel, the interposer actor 44 may communicate with the channel actor 36 to connect to the channel indicated by the new Cid. If the interposer actor 44 does not monitor or intercept the channel, the interposer actor 44 may permit the new Cid to pass through. The interposer actor 44 may transmit the (possibly modified) message on the original outbound channel to the target actor (block 96).

It is noted that, with respect to the flowchart of FIG. 4, it is possible that the inbound message may contain a new Cid to be used by the interposed actor. In some embodiments, the interposer actor 44 may detect the new Cid and possibly intercept or monitor the incoming channel as well.

For messages that are monitored (e.g. messages on Cid3 in the embodiment of FIG. 2), operation may be similar to those shown in FIGS. 4 and 5 for inbound and outbound messages to/from the interposed actor, except that the interposer actor 44 may monitor and potentially record the message contents but may not make modifications to the messages.

Figure 6:
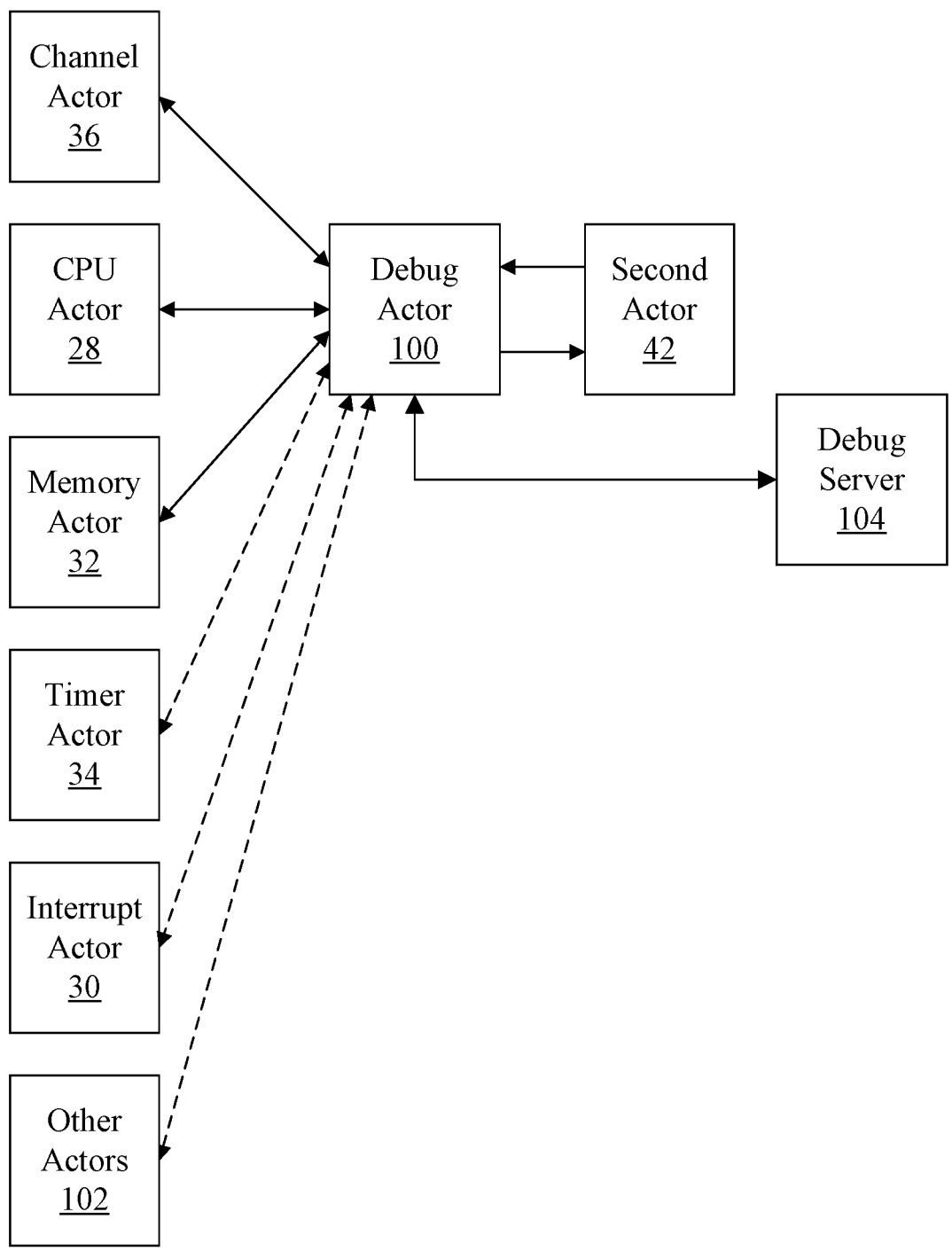
FIG. 6 is a block diagram of one embodiment of a debug actor interposed on another.

Turning next to FIG. 6, a block diagram of one embodiment of a debug actor 100 that may use interposition to aid in debugging an actor (e.g. the second actor 42, in this example) in a system using the operating system of FIG. 1. The second actor 42 may be referred to as the inferior actor since it is the actor being debugged, and thus may be subject to activation interception by the debug actor 100. The debug actor 100 is coupled to the second actor 42, and one or more of the channel actor 36, the CPU actor 28, the memory actor 32, the timer actor 34, the interrupt actor 30, and various other actors 102. The debug actor 100 is also coupled to a debug server 104.

The debug server 104 may be a process/thread-based debugger. Generally, in the process/thread model, a process exists when at least one of its threads is in execution, and does not exist when none of its threads are in execution. On the other hand, an actor may exist as a dormant actor (no current activations). When an activation occurs, the actor may respond by executing a function indicated in the message the caused the activation, after which the activation may be destroyed. State associated with the activation may be deleted. However, the actor may still exist.

In order to interact with the debug server 104 using a process/thread model, the debug actor 100 may map activations in the system to threads in the debug server 104, and may map actors to processes. By intercepting messages from other actors (activations), the debug actor 100 may detect activations and inform the debug server 104 that the activations are executing (using messages indicating that threads are executing). The debug server 104 may respond, indicating if the debug server 104 is to follow the activation (e.g. debug its execution) or allow it to run without debug interference. In an embodiment, the message regarding activations may be transmitted for activations of interest, e.g. in the case that not all channels are being interposed by the debug actor 100.

The determination on the debug server 104 of whether or not to follow the activation may be made based on user input (e.g. the individual performing the debugging using the debug server 104). Alternatively or in addition, the determination may be automatic based on the debug modes that are in effect. For example, single stepping may be in effect when an activation occurs. Single stepping may be enabled over thread boundaries, which may automatically cause single stepping into the activation. Alternatively, single stepping may not be enabled over thread boundaries, which may automatically cause the debug server 104 to permit the activation to run without single step. Similarly, breakpoint addresses or other debug features may be enabled to carry into an activation or not enabled to carry into an activation, and the determination may be automatic based on the modes.

The debug server 104 and/or the user of the debug server 104 expects to be have access to the inferior's memory address space, processor state, etc. Accordingly, the debug actor 100 may interpose on channels to the memory actor 32, the CPU actor 28, and/or the channel actor 36. The inferior, in some cases, may also interact with the timer actor 34, the interrupt actor 30, and/or other actors 102. The debug actor 100 may interpose on the channels to such actors as well, as desired. The debug actor 100 may transmit messages to the various actors to query state from those actors, which may be reported to the debug server 104.

Figure 7:
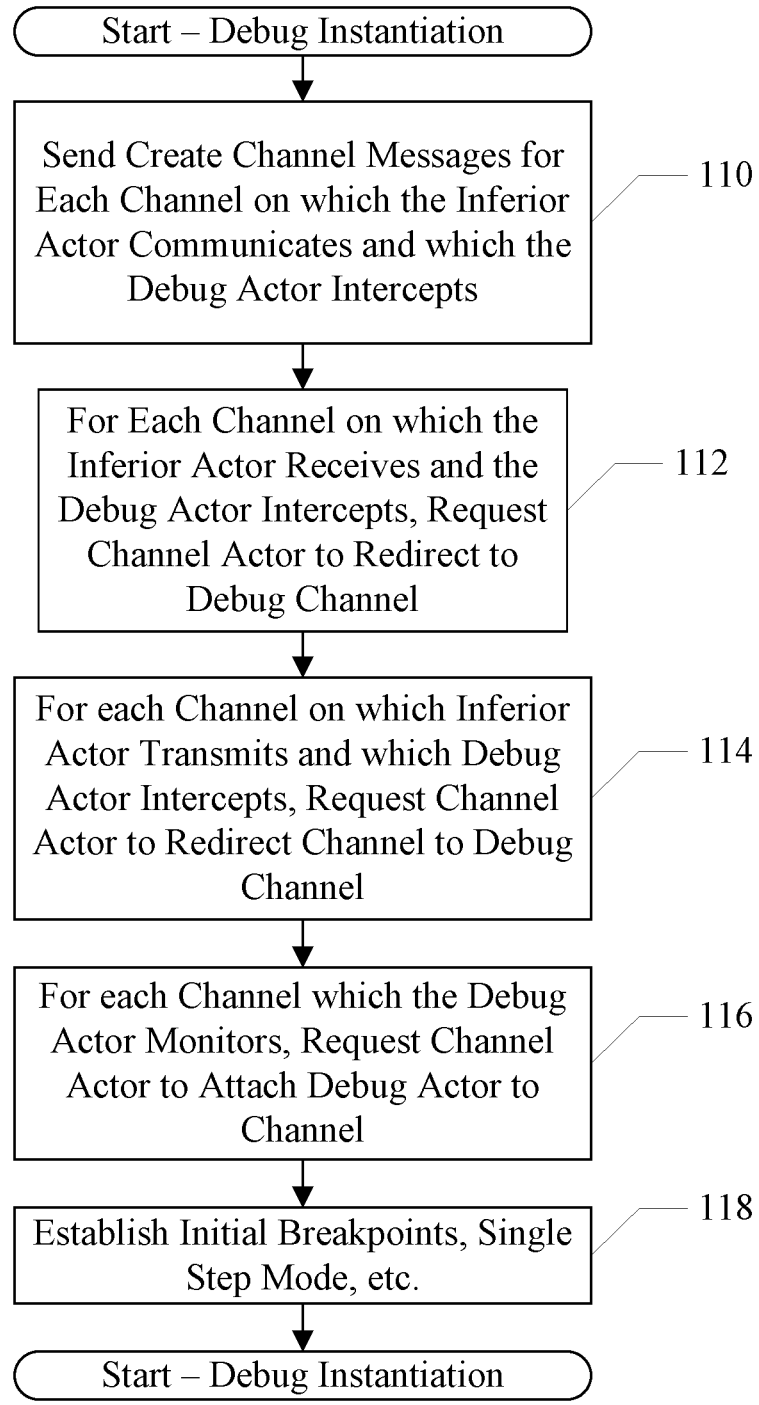
FIG. 7 is a flowchart illustrating operation of one embodiment of the operating system for debug instantiation.

FIG. 7 is a flowchart illustrating one embodiment of instantiating a debug actor 100 in the operating system. While the blocks are shown in a particular order for ease of understanding, other orders may be used. The operating system and/or various actors in the operating system may include instructions which, when executed in a computer system, may implement the operation shown in FIG. 7. That is, the operating system/actors may be configured to implement the operation shown in FIG. 7.

The operation of FIG. 7 may be performed during the build of the operating system (e.g. when the actors and kernel 10 are being compiled, or when the system is being launched). Alternatively, the operation may be performed dynamically during operation if the debug actor 100 becomes desired during operation (e.g. when the debug server 104 is prepared to debug one or more actors in the system).

The debug actor 100 may be invoked, and may transmit create channel messages to the channel actor 36 for channels on which the inferior actor (e.g. the second actor 42 in FIG. 6, or more generally the actor being debugged) communicates and which the debug actor 100 intercepts (block 110). The debug actor 100 may also transmit requests for the channel actor 36 to redirect channels on which the inferior actor receives messages and the debug actor 100 is intercepting the messages (block 112). Similarly, for each channel on which the inferior actor transmits and the debug actor 100 is intercepting messages, the debug actor 100 may requests that the channel actor 36 redirect the channel to the interposer actor 44 (block 114).

Similar to the interposer actor 44, the debug actor 100 may also monitor one or more channels without actually intercepting those channels. The debug actor 100 may, for example, transmit the message contents (or may decode the message contents and transmit messages to the debug server 104 describing the contents in a format that the debug server 104 expects). For monitored channels, the debug actor 100 may transmit requests to monitor channels to the channel actor 36 (block 116).

The flowchart of FIG. 7 presumes there is at least one type of each channel (intercepted outbound, intercepted inbound, and monitored). However, in various embodiments, one or more of the channel types may not be used and thus the corresponding requests may not be transmitted. Additionally, the operation of the channel actor 36 is not illustrated in FIG. 7. However, the channel actor 36 may determine whether or not to fulfill the requests of the debug actor 100 based on a level of trust that the channel actor 36 has for the debug actor 100.

The debug actor 100 may also set initial debug resources (via messages to the CPU actor 28) according to requests from the debug server 104. For example, initial breakpoints, single step mode settings, if any, etc. may be set (block 118).

Figure 8:
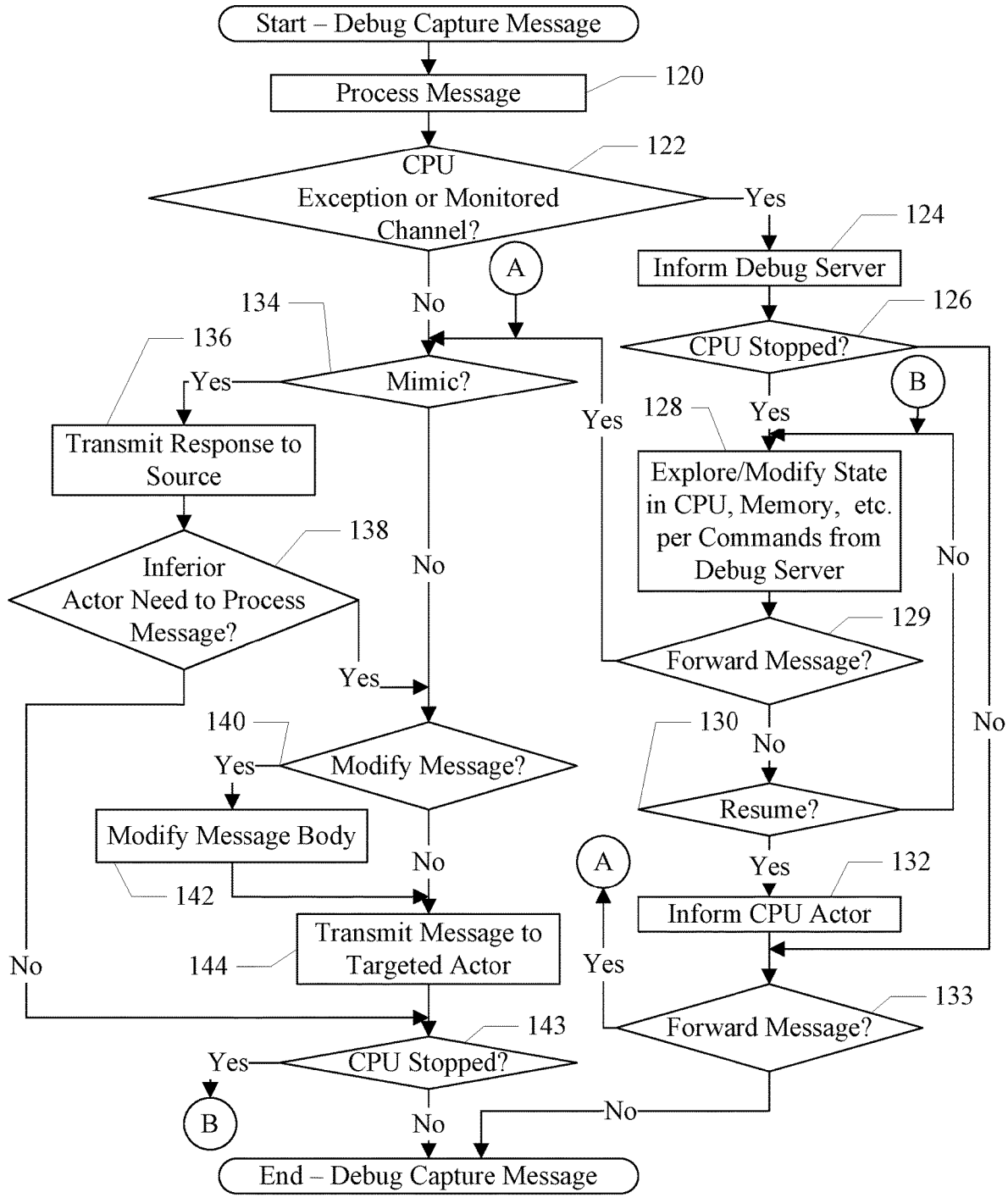
FIG. 8 is a flowchart illustrating operation of one embodiment of the operating system for a debug actor message capture.

FIG. 8 is a flowchart illustrating one embodiment of the debug actor 100 when intercepting a message for the inferior actor or monitoring a message to/from the inferior actor from/to another actor. The message may be inbound or outbound. While the blocks are shown in a particular order for ease of understanding, other orders may be used. The operating system and/or various actors in the operating system may include instructions which, when executed in a computer system, may implement the operation shown in FIG. 8. That is, the operating system/actors may be configured to implement the operation shown in FIG. 8. Viewed in another way, the debug actor 100 may perform the operation illustrated in FIG. 8 in response to an activation for a message on a channel.

The debug actor 100 may process the message, determining the contents of the message (block 120). The message may be a CPU exception from the CPU actor 28, or a message from a monitored channel from which the debug server 104 is capturing information (decision block 122). If the exception is a CPU exception, it may be a debug-related exception such as a breakpoint exception/message, a single step exception/message, or any other debug-related message from the CPU actor 28. Other types of exceptions (not debug-related) may also be processed. If the message is a CPU exception or a message on a monitored channel (decision block 122, "yes" leg), the debug actor 100 may inform the debug server 104. In the case of a monitored message, the debug actor 100 may transmit the data to the debug server 104. Debug data from debug-related messages may also be transmitted to the debug server 104. More particularly, the debug actor 100 may convert the channel-formatted messages to messages in the format the debug server 104 expects. In the case of a breakpoint, single step halt, or other event that halts the CPU execution of the activation (decision block 126, "yes" leg), the debug actor 100 may receive various commands from the debug server 104 to explore and/or modify state in the CPU, the memory space of the activation, etc. (block 128). The debug actor 100 may communicate with the corresponding actors to gather and change state as directed. Viewed in another way, the debug actor 100 may convert the messages from the debug server 104 to appropriate messages on the channels to the other actors in the system to collect/change state. Additionally, the debug actor 100 may determine if the capture message is to be forwarded to the target actor prior to processing all of the debug commands from the debug server 104 (or in response to a debug command from the debug server 104) (decision block 129). If so (decision block 129, "yes" leg), the processing flow may proceed to decision block 134 to possibly mimic and/or change the message). Furthermore, if directed by the debug server 104, the debug actor 100 may change various debug modes in the CPU, set new breakpoints, etc. via messages to the CPU actor 28.

One of the commands from the debug server 104 may be a resume command (decision block 130). If the resume command is not received, the debug actor 100 may continue exploring state (decision block 130, "no" leg and block 128). On the other hand, if the resume command is received (decision block 130, "yes" leg), the debug actor 100 may inform the CPU actor 28 that execution is to be resumed (block 132). Additionally, it is possible that the debug system would forward the message subsequent to the debug processing (decision block 133). If so (decision block 133, "yes" leg), processing moves to decision block 134. It is noted that, even if the CPU is not stopped (decision block 126, "no" leg), it is possible that the message will be forwarded (decision block 133). In an embodiment, the message may be forwarded once (either prior to completion of debug processing, decision block 129, or subsequent to completion, decision block 133). That is, forwarding of the message prior to completion may be mutually exclusive with forwarding of the message after completion, in an embodiment.

If the message is not a monitored message or a debug halt message from the CPU actor 28 (decision block 122, "no" leg), processing of the intercepted message may be similar to the discussion above for interposer actors. For certain messages or message types, the debug actor 100 may mimic the response of the inferior actor to the actor that sent the message or the response of an actor that would receive the message to the inferior actor, depending on whether the message is inbound or outbound. If the message is to be mimicked (decision block 134, "yes" leg), the debug actor 100 may perform any desired processing and transmit a response to the source actor (block 136). In some cases, the inferior actor may still act on an inbound message as well. If so (decision block 138, "yes" leg), the debug actor 100 may determine if the message is to be modified before passing the message on to the inferior actor or other target actor. If so (decision block 140, "yes" leg), the debug actor 100 may modify the message body (block 142). In either case (decision block 140, "yes" or "no" legs), the debug actor 100 may transmit the (possibly modified) message to the targeted (block 144). Similarly, for messages which are not mimicked but for which the debug actor 100 is to affect the behavior of the targeted actor for the message (decision block 134, "no" leg and decision block 140, "yes" leg), the debug actor 100 may modify the message to cause the desired behavior (block 142) and transmit the modified message to the targeted actor (block 144). For messages which may be passed through unmodified (decision blocks 134 and 140, "no" legs), the debug actor 100 may transmit the unmodified message to the targeted actor (block 144).

Because the message may be forwarded while the CPU is stopped (decision block 129), the debug actor 104 may determine if the CPU is stopped after forwarding the message to the target actor and/or mimicking the response to the source actor (decision block 143). If the CPU is stopped (decision block 143, "yes" leg), processing may return to block 128 to continue processing messages from the debug server 104 until the resume command is received.

In an embodiment, a message may contain a new Cid as well (e.g. similar to blocks 98 and 99 in FIG. 5). The debug actor 100 may manage the new Cid based on whether the channel is to be intercepted, monitored, or neither, similar to the discussion above with regard to FIG. 5.

Figure 9:
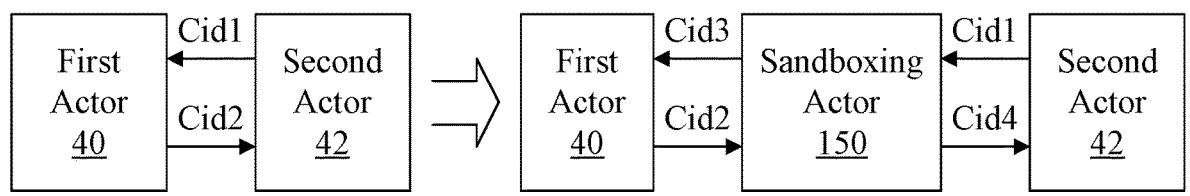
FIG. 9 is a block diagram of one embodiment of a sandboxing actor as an interposing actor.

FIG. 9 is an example illustrating another type of interposing actor, a sandboxing actor 150. Similar to FIG. 2, the first actor 40 and the second actor 42 are illustrated on the left of the arrow in FIG. 9 and the interposition of the sandboxing actor 150 is shown in the right side of the arrow. The sandboxing actor 150 may isolate the operation of the underlying second actor 42 with respect to other actors in the system in various fashions. The isolation may prevent the second actor 42 from being affected by the operation of the overall system and/or prevent the second actor 42 from affecting the operation of the overall system, as desired. In an to embodiment, the sandboxing actor 150 may support recording of the messages transmitted and received by the second actor 42, and replay of those messages at a later time.

Figure 10:
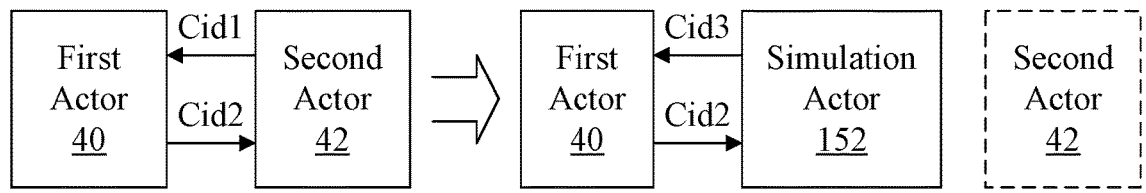
FIG. 10 is a block diagram of one embodiment of a simulation actor as an interposing actor.

FIG. 10 is an example of an actor interposing in place of the second actor 42. In this example, the interposing actor is a simulation actor 152. The second actor 42 is shown in dotted form on the right side of the arrow in FIG. 10 to illustrate that it has been fully replaced. If a simulation is being performed, long latency operations may be short-circuited to allow the simulation to complete faster. For example, if the second actor 42 were the timer actor 34, rather than wait for the actual alarm time to send a message to the first actor 40, it may be desirable to return the alarm message to the actor 40 upon receipt of the set alarm message. The simulation may be updated to indicate that the period of time has elapsed, without actually waiting for that amount of time. In an embodiment, the simulation actor may support the playback of messages from the second actor 42, based on a preceding execution of the second actor 42 and/or based on a record made by the sandboxing actor 150.

Figure 11:
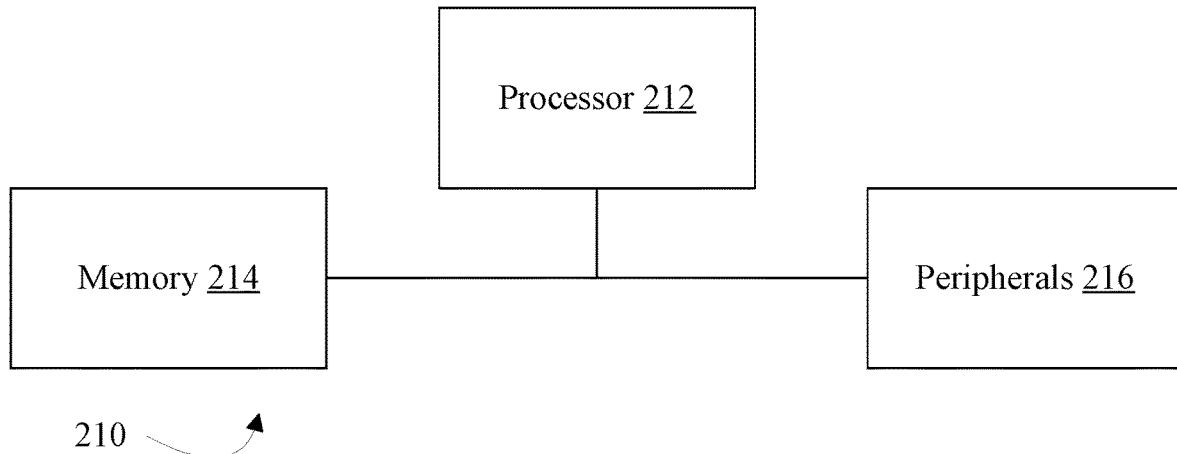
FIG. 11 is a block diagram of one embodiment of a computer system.

Tuning now to FIG. 11, a block diagram of one embodiment of an exemplary computer system 210 is shown. In the embodiment of FIG. 11, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various actors, capabilities functions, and/or the kernel. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 12:
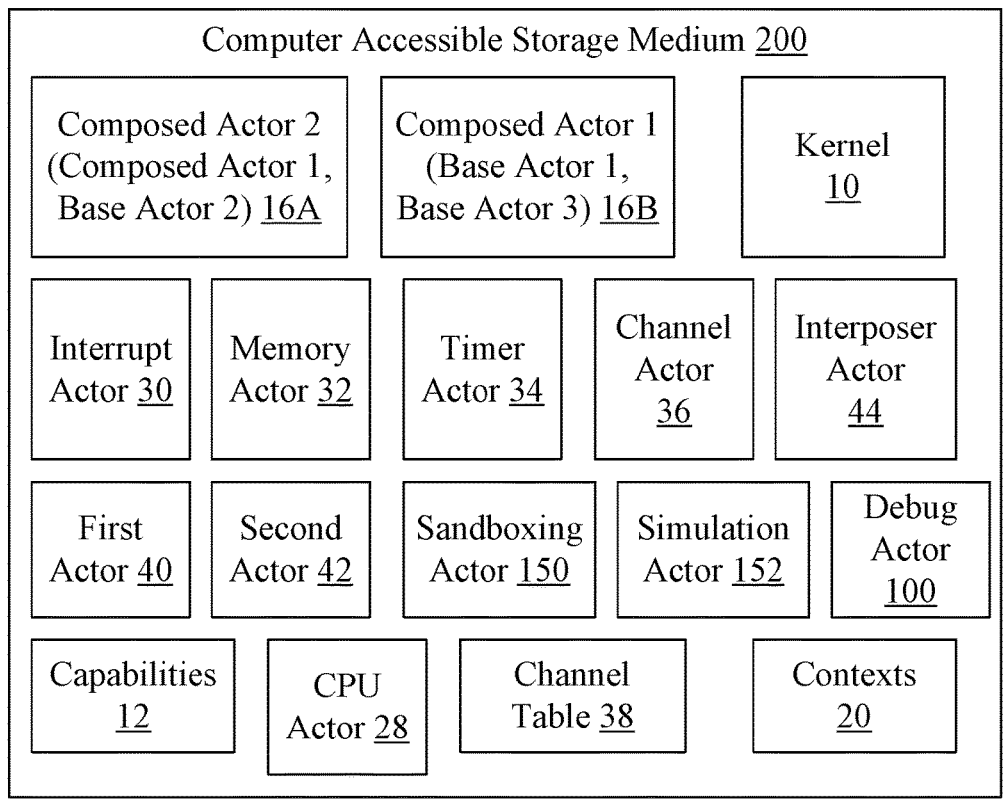
FIG. 12 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 12), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC).

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 12 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non- to volatile.

The computer accessible storage medium 200 in FIG. 12 may store code forming the various actors 16A-16B, 28, 30, 32, 34, 36, 40, 42, 44, 100, 150, and 152, the kernel 10, and/or the functions in the capabilities 12. The computer accessible storage medium 200 may still further store one or more data structures such as the channel table 38 and the contexts 20. The various actors 14A-14C, 30, 32, 34, 36, 40, 42, 44, 100, 150, and 152, the kernel 10, and/or the functions in the capabilities 12 may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions that are computer-executable, the plurality of instructions comprising:

a channel actor configured to control channels between a plurality of actors forming a system, wherein the plurality of actors communicate using the channels; and an interposer actor configured to interpose between a first actor of the plurality of actors and at least one other actor of the plurality of actors, wherein the interposer actor is configured to communicate to the channel actor to reroute one or more channels between the at least one other actor and the first actor to the interposer actor.

2. The non-transitory computer accessible storage medium as recited in claim 1 wherein the interposer actor is further configured to receive an inbound message to the first actor and to mimic a response to the inbound message to a sender of the inbound message.

3. The non-transitory computer accessible storage medium as recited in claim 2 wherein the interposer actor is configured to pass the inbound message to the first actor.

4. The non-transitory computer accessible storage medium as recited in claim 3 wherein the interposer actor is configured to modify the inbound message prior to passing the inbound message to the first actor.

5. The non-transitory computer accessible storage medium as recited in claim 3 wherein the interposer actor is configured to receive a second response to the inbound message from the first actor, and wherein the interposer actor is configured to terminate the second response without forwarding the second response.

6. The non-transitory computer accessible storage medium as recited in claim 1 wherein the interposer actor is configured to receive an outbound message from the first actor to a targeted actor of the plurality of actors, wherein the interposer actor is configured to filter the outbound message.

7. The non-transitory computer accessible storage medium as recited in claim 6 wherein the interposer actor is configured to mimic a response to the outbound message.

8. The non-transitory computer accessible storage medium as recited in claim 6 wherein the interposer actor is configured to modify the outbound message.

9. The non-transitory computer accessible storage medium as recited in claim 1 wherein the interposer actor is a debug actor configured to communicate with a debug server.

10. The non-transitory computer accessible storage medium as recited in claim 9 wherein the debug actor, responsive to a debug event that halts processing of the first actor by a processor in a computer system that includes the debug actor and the channel actor, is configured to transmit one or more messages to the debug server indicating the debug event.

11. The non-transitory computer accessible storage medium as recited in claim 10 wherein the debug actor is configured to convert messages received from the computer system into a format used by the debug server.

12. The non-transitory computer accessible storage medium as recited in claim 10 wherein the debug actor is configured to receive one or more messages from the debug server and to collect state from the system specified by the one or more messages, wherein the debug server is configured to respond to the one or more messages with the state.

13. The non-transitory computer accessible storage medium as recited in claim 12 wherein the debug actor is configured to convert messages received from the debug server into a format used on the channels.

14. The non-transitory computer accessible storage medium as recited in claim 12 wherein the state includes processor state.

15. The non-transitory computer accessible storage medium as recited in claim 12 wherein the state includes data from a memory space of the first actor.

16. The non-transitory computer accessible storage medium as recited in claim 10 wherein the debug actor is configured to forward an intercepted message while the processor is stopped and before processing of debug messages from the debug server.

17. The non-transitory computer accessible storage medium as recited in claim 10 wherein the debug actor is configured to forward an intercepted message after processing of debug messages from the debug server.

18. The non-transitory computer accessible storage medium as recited in claim 10 wherein the debug actor is configured to record messages corresponding to the first actor.

19. The non-transitory computer accessible storage medium as recited in claim 10 wherein the debug actor is configured to play back previously recorded messages corresponding to the first actor.

20. The non-transitory computer accessible storage medium as recited in claim 19 wherein the debug actor is a simulation actor used in place of the first actor in a simulation.

21. A computer system comprising:
one or more processors; and
a non-transitory computer accessible storage medium coupled to the one or more processors and storing a plurality of instructions that are executable by the one or more processors, the plurality of instructions comprising:
a channel actor configured to control channels between a plurality of actors forming a system, wherein the plurality of actors communicate using the channels; and
an interposer actor configured to interpose between a first actor of the plurality of actors and at least one other actor of the plurality of actors, wherein the interposer actor is configured to communicate to the channel actor to reroute one or more channels between the at least one other actor and the first actor to the interposer actor.

22. The computer system as recited in claim 21 wherein the interposer actor is further configured to receive an inbound message to the first actor and to mimic a response to the inbound message to a sender of the inbound message.

23. The computer system as recited in claim 22 wherein the interposer actor is configured to pass the inbound message to the first actor, and wherein the interposer actor is configured to modify the inbound message prior to passing the inbound message to the first actor.

24. The computer system as recited in claim 23 wherein the interposer actor is configured to receive a second response to the inbound message from the first actor, and wherein the interposer actor is configured to terminate the second response without forwarding the second response.

25. The computer system as recited in claim 21 wherein the interposer actor is configured to receive an outbound message from the first actor to a targeted actor of the plurality of actors, wherein the interposer actor is configured to filter the outbound message.

26. The computer system as recited in claim 25 wherein the interposer actor is configured to mimic a response to the outbound message.

27. The computer system as recited in claim 25 wherein the interposer actor is configured to modify the outbound message.

28. A computer system comprising:
one or more processors; and
a non-transitory computer accessible storage medium coupled to the one or more processors and storing a plurality of instructions that are executable by the one or more processors, the plurality of instructions comprising:

a channel actor configured to control channels between a plurality of actors forming a system, wherein the plurality of actors communicate using the channels; and a debug actor configured to interpose between a first actor of the plurality of actors and at least one other actor of the plurality of actors, wherein the debug actor is configured to communicate to the channel actor to reroute one or more channels between the at least one other actor and the first actor to the debug actor, and wherein the debug actor is configured to communicate with a debug server.

29. The computer system as recited in claim 28 wherein the debug actor, responsive to a debug event that halts processing of the first actor by the one or more processors, is configured to transmit one or more messages to the debug server indicating the debug event.

30. The computer system as recited in claim 29 wherein the debug actor is configured to convert messages received from the computer system into a format used by the debug server.

31. The computer system as recited in claim 29 wherein the debug actor is configured to receive one or more messages from the debug server and to collect state from the computer system specified by the one or more messages, wherein the debug server is configured to respond to the one or more messages with the state.

32. The computer system as recited in claim 31 wherein the debug actor is configured to convert messages received from the debug server into a format used on the channels.

33. The computer system as recited in claim 31 wherein the state includes processor state.

34. The computer system as recited in claim 31 wherein the state includes data from a memory space of the first actor.

35. The computer system as recited in claim 29 wherein the debug actor is configured to forward an intercepted message while the one or more processors are stopped and before processing of debug messages from the debug server.

36. The computer system as recited in claim 29 wherein the debug actor is configured to forward an intercepted message after processing of debug messages from the debug server.

37. The computer system as recited in claim 29 wherein the debug actor is configured to record messages corresponding to the first actor.

38. The computer system as recited in claim 29 wherein the debug actor is configured to play back previously recorded messages corresponding to the first actor.

* * * * *